United States Patent
Wahl et al.

(10) Patent No.: US 6,782,982 B2
(45) Date of Patent: Aug. 31, 2004

(54) HYDRODYNAMIC CONVERTER

(75) Inventors: Georg Wahl, Crailsheim (DE); Hans Schirle, Stimpfach (DE); Marjan Gantar, Ljubljana (SI); Rok Pavlin, Ljubljana (SI); Dusan Florjancic, Zirovnica (SI)

(73) Assignee: Voith Turbo GmbH & Co. KG (DE)

( * ) Notice: Subject to any disclaimer, the term of this patent is extended or adjusted under 35 U.S.C. 154(b) by 0 days.

(21) Appl. No.: 10/111,050
(22) PCT Filed: Jul. 18, 2001
(86) PCT No.: PCT/EP01/08274
§ 371 (c)(1), (2), (4) Date: Aug. 7, 2002
(87) PCT Pub. No.: WO02/14706
PCT Pub. Date: Feb. 21, 2002

(65) Prior Publication Data
US 2003/0037543 A1 Feb. 27, 2003

(51) Int. Cl.$^7$ .............................................. F16D 33/00
(52) U.S. Cl. ........................................ 192/3.28; 60/361
(58) Field of Search ............................. 192/3.28, 3.29, 192/3.3; 60/361, 330

(56) References Cited

U.S. PATENT DOCUMENTS

| | | | | |
|---|---|---|---|---|
| 2,301,645 A | * | 11/1942 | Sinclair | 60/365 |
| 3,677,003 A | * | 7/1972 | Schneider | 60/361 |
| 3,888,082 A | * | 6/1975 | Haide | 60/361 |
| 4,073,139 A | * | 2/1978 | Armasow et al. | 60/357 |
| 4,848,084 A | * | 7/1989 | Wirtz | 60/342 |
| 4,951,467 A | * | 8/1990 | Walsh et al. | 60/361 |
| 6,289,674 B1 | * | 9/2001 | Halene et al. | 60/361 |
| 6,463,740 B1 | * | 10/2002 | Schmidt et al. | 192/3.29 |

OTHER PUBLICATIONS

"Föttinger–Kupplungen und Föttinger–Getriebe: Konstruktion und Berechnung," by Dipl.–Ing. Ernst Kickbusch, Berlin/Göttingen/Heidelberg, 1963.

"Hydrodynamische Getriebe Kupplungen Bremsen," by Voith.

"2.2.1. Einphasige Wandler," in Entwurf VDI 2153.

* cited by examiner

Primary Examiner—Rodney H. Bonck
(74) Attorney, Agent, or Firm—Ostrolenk, Faber, Gerb & Soffen, LLP

(57) ABSTRACT

The invention relates to a hydrodynamic converter comprising a torus-shaped working chamber surrounding the converter axis, said chamber having the form of a ring channel in an axial cross-section; an impeller which is rotationally fixed to an input shaft; a turbine wheel which is rotationally fixed to an output shaft, and a ring of adjustable guide vanes. The converter is designed in such a way that it has a lambda value of less than 0.0005.

10 Claims, 3 Drawing Sheets

HYDRODYNAMIC CONVERTER

BACKGROUND OF THE INVENTION

The invention relates to a hydrodynamic converter with a torus-shaped working chamber, an impeller, a turbine wheel and a ring of adjustable guide vanes.

In particular, the invention relates to a converter for use in a machine set in which the drive is a gas turbine and the machine is a compressor. The power outputs here are extremely high, being of the order of 20 megawatts and above. Owing to these extreme power outputs, the machines also have extremely large revolving masses, which, by their very nature, lead in turn to special problems.

The requirements of a machine set of the stated type, especially one with a gas turbine and a compressor, are as follows:

the compressor must be started up without the drive being overloaded the compressor must be run up to a speed that is equal to the speed of the drive, i.e. the two machines must run synchronously with one another once synchronicity has been achieved, a direct mechanical drive connection must be established between the drive and the machine in the case of many machine sets of the stated type, especially those comprising a gas turbine as a drive and a compressor as a machine, it may be necessary to have the gas turbine run continuously, even when the compressor is switched off.

In principle, a hydrodynamic converter would be suitable as an intermediate member between the gas turbine and the compressor. However, converters known hitherto are not capable of performing the functions mentioned, if only for reasons of strength. When they are partially filled, cavitation occurs owing to the high power outputs involved. When completely filled, a converter of the type stated cannot cope with the extreme power outputs required.

SUMMARY OF THE INVENTION

The object of the invention is to specify a hydrodynamic converter which is suitable, in particular, as an intermediate member between a gas turbine and a compressor. A converter of this kind should be able to transmit extremely high power outputs and effect synchronicity between the gas turbine and the compressor.

The object is achieved by the features of invention. The converter includes an input shaft on which an impeller is rotationally fixed, an output shaft on which a turbine wheel is rotationally fixed and the impeller and turbine wheel together define a torus shaped working chamber which surrounds the axis of the converter and the shafts. The torus shaped working chamber has the form of a ring channel when viewed in axial section. A ring of adjustable guide vanes is disposed in the working chamber. The impeller and the turbine have respective flow channels in the working chamber and working fluid flows around the ring channel, through the flow channels of the impeller and the turbine wheel and past the guide vanes. The converter is configured so that it has a lambda value of less than 0.005 and a speed ratio between the turbine wheel and the impeller on the order of one. As a result of the arrangement in placement of the flow channels of the impeller and the turbine, flow of working fluid through the flow channels of the impeller is essentially centrifugal, while flow of working fluid through the flow channels of the turbine wheel is essentially centripetal. The flow channels of the impeller and turbine wheel are so positioned that the leading edges of the impeller blades and the trailing edges of the turbine blades are closer to the converter axis than the other edges of the impeller blades and the turbine blades.

When the converter is used in a machine for high power output, there is in addition a separately operable tooth clutch connected in parallel with the converter with a clutch half rotationally fixed to each of the shafts and one of the clutch halves being moveable to selectively engage and disengage the clutch halves while both clutch halves remain rotationally fixed to the respective shafts.

In the past, the aim with hydrodynamic converters was to achieve a high $\lambda$ value in order to keep the overall volume of the converter small. Admittedly, an extremely small $\lambda$ value, of the order of 0.0005, is achieved with the configuration according to the invention. At the same time, the speed ratio v between the speed of the turbine wheel and that of the impeller is of the order of one. Efficiency is high. It is of the order of 0.75 and above.

With the configuration according to the invention, the flow through the channels of the impeller is essentially centrifugal. That through the channels of the turbine wheel is essentially centripetal, something that is unusual in the case of converters. Thanks to this configuration, extremely high power outputs can be transmitted with a moderate overall volume, a high efficiency and the ability to establish the synchronized condition.

BRIEF DESCRIPTION OF THE DRAWINGS

The invention is explained in detail with reference to the drawing, in which the following are illustrated in particular.

DESCRIPTION OF A PREFERRED EMBODIMENTS

Figure 1:
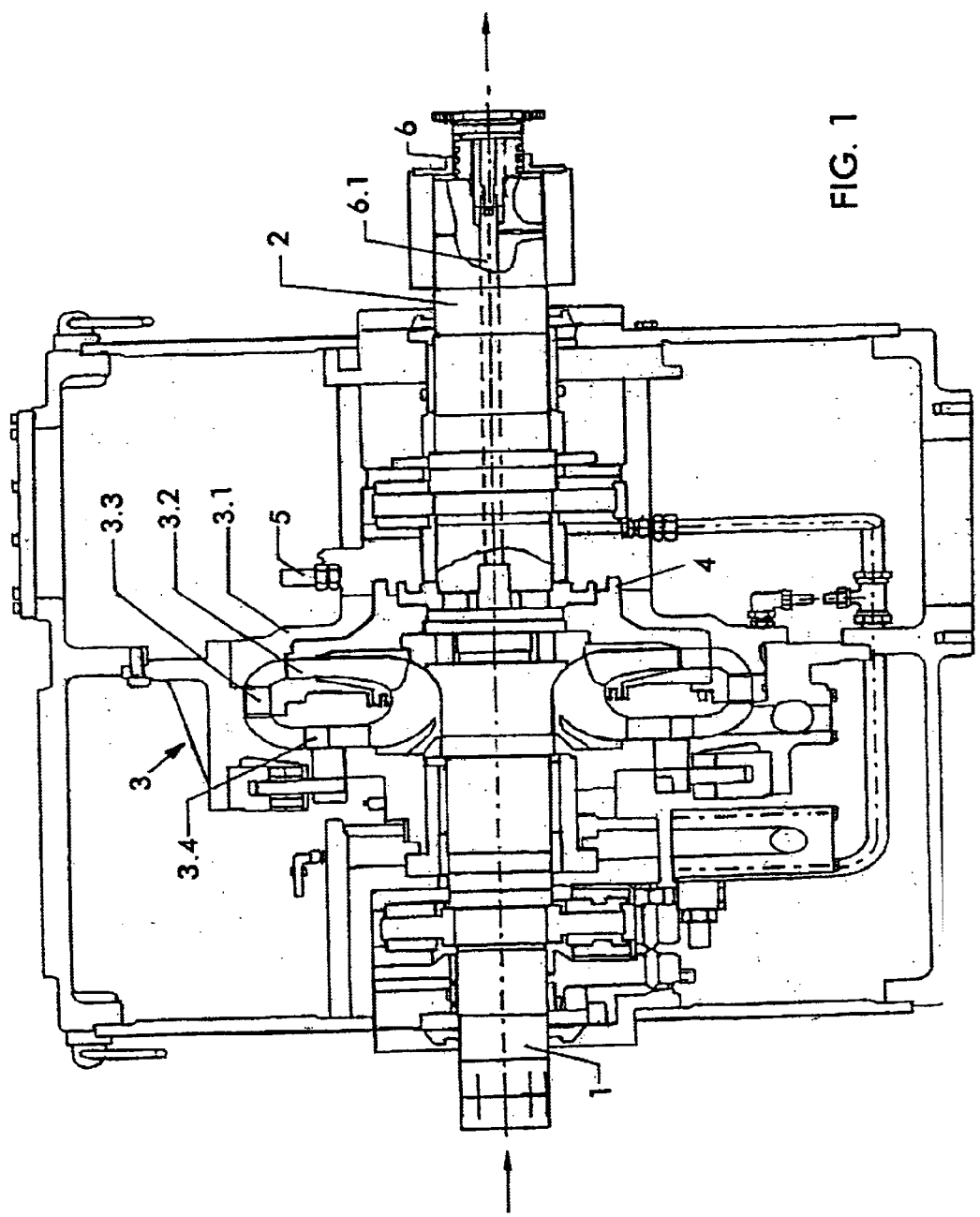
FIG. 1 shows a converter according to the invention with a tooth clutch as an intermediate member between a gas turbine (not shown) and a compressor (not shown).

FIG. 1 shows the input shaft 1 and the output shaft 2 of the converter. The converter is inserted between a gas turbine (not shown here) and a compressor (likewise not shown). The converter 3 is assigned to a tooth clutch 4.

The converter 3 and the tooth clutch 4 are connected in parallel. Both the converter 3 and the tooth clutch 4 can transmit torque from the input shaft 1 to the output shaft 2 on their own but can also do so jointly.

Converter 3 can be filled and emptied. It comprises an impeller 3.1 and a turbine wheel 3.2. It furthermore comprises a fixed guide-vane wheel 3.3 and an adjustable guide-vane wheel 3.4.

The impeller 3.1 of the converter 3 is rotationally fixed to the input shaft 1. The turbine wheel 3.2 of the converter is rotationally fixed to the output shaft 2.

Figure 2:
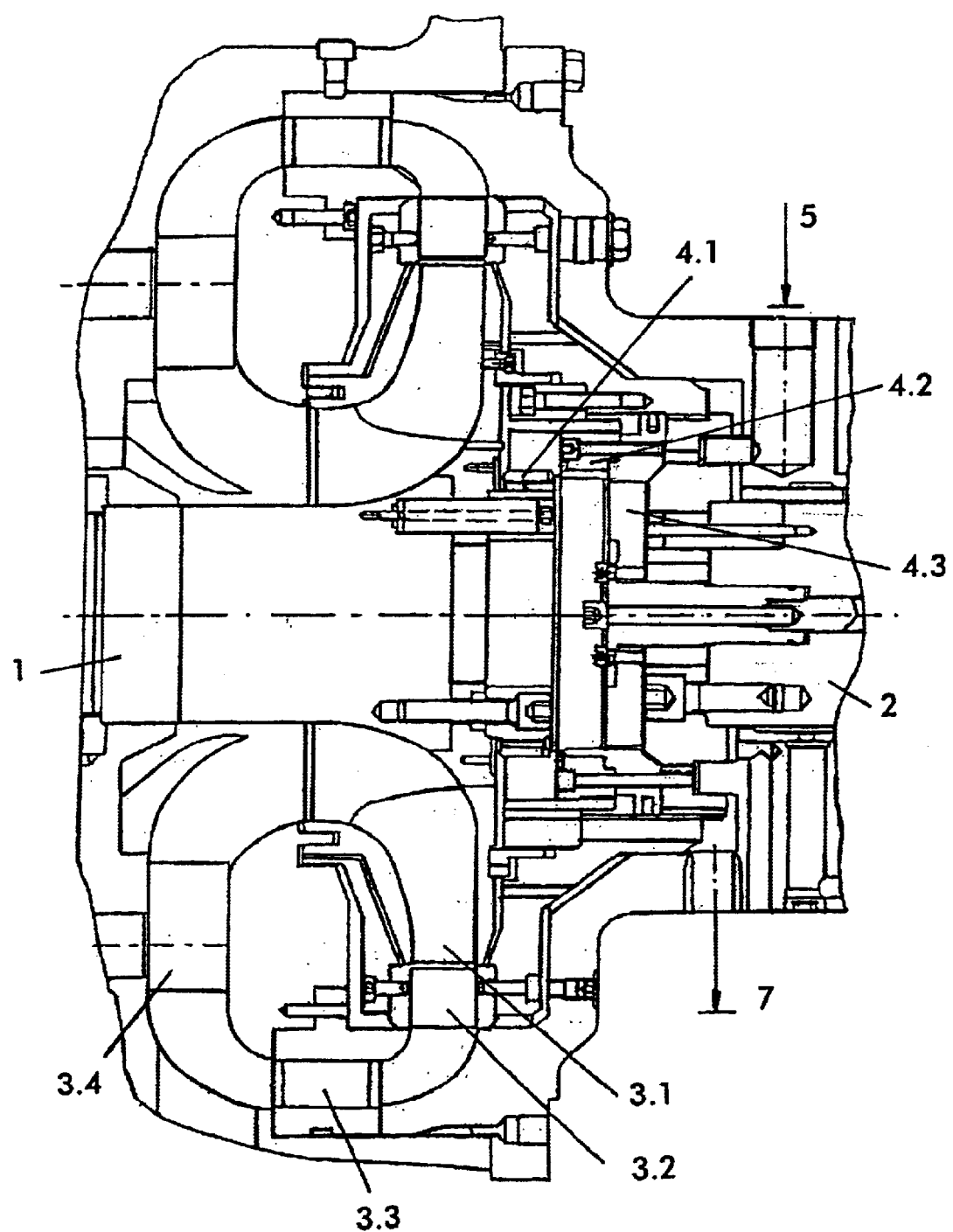
FIG. 2 shows an enlarged excerpt of the subject matter of FIG. 1.

FIG. 2 shows the conditions in the region of the converter and the tooth clutch in greater detail. The tooth clutch 4 comprises two clutch halves. One clutch half—a pinion 4.1—is rotationally fixed to the input shaft 1. The other half—a gear ring 4.2—is rotationally fixed to the output shaft 2. Gear ring 4.2 can be displaced to the left in FIG. 2. If this displacement is performed, the clutch 4 is thereby closed.

A connection 5 for control oil is provided. Through this it is possible to introduce control oil into the interior of the clutch housing, more specifically in such a way that it acts upon a piston 4.3 which, for its part, displaces the gear ring 4.2 to the left. The connection 5 is assigned a valve (not shown here).

A set of diaphragm springs 6 is important in connection with the actuation of the clutch (see FIG. 1). While control oil displaces the piston 4.3 to the left when allowed into the connection 5 and thereby closes the clutch 4, the diaphragm springs 6 have the opposite tendency. They tend to open the clutch 4.

As described above, synchronicity between the gas turbine and the compressor is established during the start-up process, as it is therefore between the input shaft 1 and the output shaft 2. The fact that synchronicity exists is detected by sensors (not shown here). At this instant, said valve of the control-oil connection 5 is opened. Control oil enters, acts upon the piston 4.3 and displaces the gear ring 4.2 to the left, thus closing the clutch 4. The clutch remains closed until the pressure of the control oil on the piston 4.3 remains steady. The valve ahead of the connection 5 is therefore left open for as long as the clutch is to remain closed.

If the intention is to open the clutch 4, said valve of the control-oil connection 5 is closed and control oil is allowed to escape at some other point, e.g. by opening an outlet 7—see FIG. 2. If these conditions exist—control-oil inlet at connection 5 closed and control-oil outlet 7 opened—only the springs 6 act on the piston 4.3, via a rod 6.1, with the result that the piston 4.3 is moved to the right in FIG. 2, as is therefore the gear ring 4.2. The clutch is opened and torque is no longer transmitted via the clutch 4.

Figure 3:
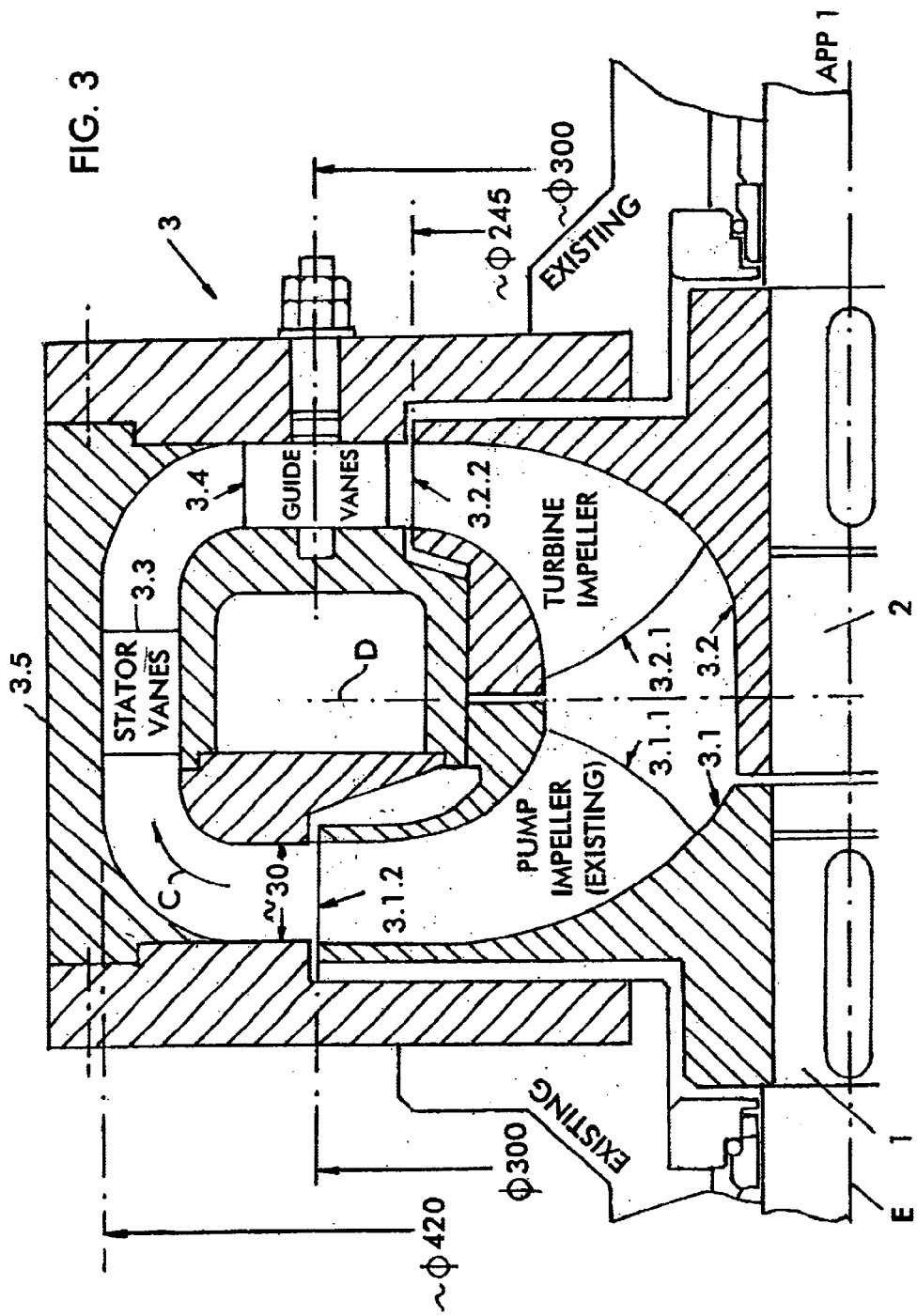
FIG. 3 shows a converter according to the invention on an enlarged scale.

FIG. 3 again shows the input shaft 1, which here is simultaneously the input shaft 1 of the converter 3, and furthermore shows the driving shaft 2 of the compressor (not shown here), which here is simultaneously the output shaft 2 of the converter 3.

This figure once again shows the impeller 3.1, the turbine wheel 3.2, a fixed guide-vane wheel 3.3 and an adjustable guide-vane wheel 3.4. The arrow C indicates the direction of flow in the flow channel, which is formed essentially by the converter housing 3.5 and the blades of the impeller and the turbine wheel. As can be seen, the flow through the channels of the impeller 3.1 is centrifugal, while the flow through the channels of the turbine wheel 3.2 is centripetal.

A broken line D runs perpendicularly to the axis E of rotation of the converter. The impeller 3.1 and the turbine wheel 3.2 lie on both sides of the line D.

The figure shows the leading edge 3.1.1 and the trailing edge 3.1.2 of an impeller blade and the leading edge 3.2.2 and trailing edge 3.2.1 of a turbine blade. The leading edge 3.1.1 and the trailing edge 3.2.1 are directly opposite one another. There is thus no longer any kind of hydrodynamic element between them. These two edges are closer at the converter axis E than the two other edges 3.1.2 and 3.2.2.

If the ring channel in which the flow in accordance with arrow C flows is regarded approximately as a circular channel, it may be stated that the impeller blades are located in the first, rising quadrant and the turbine blades are located in the second, falling quadrant.

What is claimed is:

1. A hydrodynamic converter, comprising:
   a torus shaped working chamber for holding a working fluid, the chamber surrounding an axis of the converter, the chamber having the form of a ring channel with quadrants when the chamber is viewed in axial section;
   a rotatable input shaft, an impeller rotationally fixed to rotate with the input shaft, and the impeller being shaped to partially define the working chamber; the impeller having an array of impeller blades;
   a rotatable output shaft rotatable independently of the input shaft; a turbine wheel rotationally fixed to rotate with the output shaft, and the turbine wheel also being shaped to partially define the working chamber together with the impeller; the turbine wheel having an array of turbine blades;
   the quadrants of the ring channel of the working chamber include a first rising quadrant near the input shaft, a second rising quadrant away from the input shaft, a first falling quadrant away from the output shaft and a second falling quadrant near the output shaft;
   with respect to a flow of working fluid, which flow is caused by the blades in the working chamber, the impeller blades are in the first rising quadrant and the turbine blades are in the second falling quadrant;
   a ring of adjustable guide vanes in the working chamber;
   the converter being configured to have a lambda value of less than 0.0005.

2. The converter of claim 1, wherein the impeller, the turbine wheel, the guide vanes and the working chamber are configured so that there is a speed ratio v between the speed of the turbine wheel and the speed of the impeller on the order of one.

3. The converter of claim 1, wherein the impeller has respective first flow channels and the turbine wheel has respective second flow channels;
   the impeller, the turbine wheel and the working chamber are configured and so placed in the ring channel that the flow through the first channels of the impeller is essentially centrifugal and the flow through the second channels of the turbine wheel is essentially centripetal.

4. The converter of claim 3, wherein the impeller comprises a plurality of impeller blades having respective first leading edges and first trailing edges with respect to a direction of flow of a working liquid through the ring channel shaped working chamber, and the turbine wheel comprises a plurality of turbine blades having respective second leading edges and second trailing edges with respect to the direction of flow of the working fluid through the ring channel shaped working chamber;
   the first leading edges of the impeller blades and the second trailing edges of the turbine blades are closer to the axis of the converter than the first trailing edges of the impeller blades and the second leading edges of the turbine blades.

5. The converter of claim 4, wherein the impeller and the turbine wheel lie on opposite sides of a plane perpendicular to the axis.

6. The converter of claim 4, wherein the first leading edges of the impeller blades and the second trailing edges of the turbine blades are placed in the working chamber for causing the flow of working fluid through the flow channels of the impeller blades to be centrifugal and the flow of working fluid through the flow channels of the turbine wheel blades to be centripetal.

7. The converter of claim 6, wherein the impeller blades and the turbine blades are constructed and arranged symmetrically relative to the plane perpendicular to the axis.

8. The converter of claim 3, wherein the impeller comprises a plurality of impeller blades having respective first leading edges and first trailing edges with respect to a direction of flow of the working fluid through the ring channel shaped working chamber, and the turbine wheel comprises a plurality of turbine blades having respective second leading edges and, second trailing edges with respect to the direction of flow of the working fluid through the ring channel shaped working chamber;

wherein the first leading edges of the impeller blades and the second trailing edges of the turbine blades are placed in the working chamber for causing the flow of the working fluid through the flow channels of the impeller blades to be centrifugal and the flow of the working fluid through the flow channels of the turbine wheel blades to be centripetal.

9. The converter of claim 1, further comprising a tooth clutch connected in parallel with the converter including a first clutch half rotationally fixed to the impeller shaft and a second clutch half rotationally fixed to the turbine shaft, wherein one of the clutch halves is selectively moveable along the respective shaft for engaging or disengaging the other clutch half while the clutch halves remain rotationally fixed to the respective shaft.

10. A machine for high power outputs comprising:

the machine having a driving shaft, and a drive with a driven shaft;

a converter of claim 1 inserted between the drive and the machine; wherein the impeller shaft is connected with the driving shaft and the turbine shaft is connected with the driven shaft, and wherein the chamber of the converter can be filled and emptied with working fluid;

a tooth clutch connected in parallel with the converter including a first clutch half rotationally fixed to the driven shaft of the drive and a second clutch half rotationally fixed to the driving shaft of the machine, and one of the clutch halves being selectively moveable for engaging and disengaging the clutch halves while the clutch halves remain rotationally fixed to the respective shafts.

* * * * *